US008755949B2

(12) United States Patent
Lim et al.

(10) Patent No.: US 8,755,949 B2
(45) Date of Patent: Jun. 17, 2014

(54) TELEMATICS SYSTEM USING HUMAN BODY COMMUNICATION, PORTABLE DEVICE HAVING TELEMATICS FUNCTION USING HUMAN BODY COMMUNICATION, AND METHOD FOR PROVIDING TELEMATICS SERVICE USING HUMAN BODY COMMUNICATION

(75) Inventors: In Gi Lim, Daejeon (KR); Sung Weon Kang, Daejeon (KR); Hyung Il Park, Daejeon (KR); Chang Hee Hyoung, Daejeon (KR); Jung Hwan Hwang, Daejeon (KR); Tae Wook Kang, Daejeon (KR); Kyung Soo Kim, Daejeon (KR); Jung Bum Kim, Daejeon (KR); Sung Eun Kim, Seoul (KR); Seok Bong Hyun, Daejeon (KR); Kyung Hwan Park, Daejeon (KR); Byoung Gun Choi, Daegu (KR); Tae Young Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 702 days.

(21) Appl. No.: 12/950,970

(22) Filed: Nov. 19, 2010

(65) Prior Publication Data
US 2011/0153118 A1  Jun. 23, 2011

(30) Foreign Application Priority Data

Dec. 22, 2009  (KR) .................. 10-2009-0129268
May 12, 2010  (KR) .................. 10-2010-0044419

(51) Int. Cl.
*G06F 7/00* (2006.01)
*G08B 29/00* (2006.01)
*H04M 1/00* (2006.01)

(52) U.S. Cl.
CPC *G06F 7/00* (2013.01); *G08B 29/00* (2013.01); *H04M 1/00* (2013.01)
USPC ............................ 701/2; 340/5.52; 455/569.2

(58) Field of Classification Search
CPC ......... G06F 21/35; G06F 3/041; G06F 17/40; G06F 19/00; G06F 3/048; G06F 7/00; H04H 60/16; H04W 4/00; G05B 23/00; G01C 21/36; G08G 1/052; G08B 29/00; H04M 1/00
USPC .................. 701/2, 31.4; 340/5.72; 455/426.1; 713/186
See application file for complete search history.

(56) References Cited

U.S. PATENT DOCUMENTS 6,992,565 B1 *  1/2006  Giesler ..................... 340/5.72
2007/0229219 A1  10/2007  Nakashima et al.
(Continued)

FOREIGN PATENT DOCUMENTS

JP  2008-008111 A  1/2008
JP  2009-203759 A  9/2009
(Continued)

*Primary Examiner* — Tuan C. To
*Assistant Examiner* — Yuri Kan

(57) ABSTRACT

Disclosed are a telematics system using human body communication, a portable device having a telematics function using human body communication, and a method for providing a telematics service using human body communication. The telematics system using human body communication includes: a vehicle receiving an authentication key from at least one portable device through human body communication using a human body as a medium, and controlling the opening and closing of a door of the vehicle based on whether or not the received authentication key is valid; and a first portable device transmitting a first authentication key through a user's body in contact with the vehicle.

17 Claims, 10 Drawing Sheets

(56) References Cited

U.S. PATENT DOCUMENTS

| | | | |
|---|---|---|---|
| 2008/0059806 A1* | 3/2008 | Kishida et al. | 713/186 |
| 2008/0249944 A1* | 10/2008 | Song et al. | 705/51 |
| 2008/0259043 A1* | 10/2008 | Buil et al. | 345/173 |
| 2009/0187300 A1* | 7/2009 | Everitt et al. | 701/29 |
| 2009/0219134 A1 | 9/2009 | Nakasati et al. | |
| 2009/0312012 A1* | 12/2009 | Tieman et al. | 455/426.1 |
| 2010/0001830 A1 | 1/2010 | Woo | |
| 2011/0153118 A1* | 6/2011 | Lim et al. | 701/2 |

FOREIGN PATENT DOCUMENTS

| | | |
|---|---|---|
| JP | 2010-013077 A | 1/2010 |
| JP | 2010-90635 A | 4/2010 |
| KR | 10-2007-0055473 A | 5/2007 |

\* cited by examiner

TELEMATICS SYSTEM USING HUMAN BODY COMMUNICATION, PORTABLE DEVICE HAVING TELEMATICS FUNCTION USING HUMAN BODY COMMUNICATION, AND METHOD FOR PROVIDING TELEMATICS SERVICE USING HUMAN BODY COMMUNICATION

CROSS-REFERENCE TO RELATED APPLICATIONS

This application claims the priority of Korean Patent Application Nos. 10-2009-0129268 filed on Dec. 22, 2009, and 10-2010-0044419 filed on May 12, 2010, in the Korean Intellectual Property Office, the disclosures of which are incorporated herein by reference.

BACKGROUND OF THE INVENTION

1. Field of the Invention

The present invention relates to telematics and, more particularly, to a telematics system using human body communication, a portable device having a telematics function using human body communication, and a method for providing a telematics service using human body communication.

2. Description of the Related Art

Telematics, a compound word combining telecommunication and informatics, refers to a radio data service allowing information to be exchanged through an information processing device provided in transportation equipment such as ground vehicles, aircraft, vessels, and the like, a radio communications technique, a global positioning system (GPS), a technique of interchanging text signals and voice signals over the Internet, and the like.

In particular, a vehicle telematics service, grafting a mobile communication technique and a location tracking technique onto vehicles, provides a method of vehicle accident or theft detection, a navigation system, traffic and living information, games, and the like, to drivers.

Also, when a vehicle has a mechanical trouble while running on the road, the vehicle's telematics may be connected to a service center. The vehicle telematics may receive e-mail or provide road information through a display device installed in front of the driver's seat, or provide computer games through a display device installed at the back seat of the vehicle. In addition, a control device connected to an engine of the vehicle records the states of major parts of the vehicle, so it can provide a precise breakdown (or failure) location and the cause of the breakdown to mechanics any time.

However, the related art vehicle telematics system as described above provides information largely by using devices fixedly installed in the vehicle. Thus, when the user leaves the vehicle (i.e., his vehicle), provision of services is limited, and in addition, in order to receive the telematics services, an extra device associated with the vehicle is required.

Korean Laid Open Publication No. 2005-30313 (Title: Apparatus for automatically opening and closing a vehicle door by using a mobile phone) discloses a technique in which a vehicle and a mobile phone recognize mutual locations through global positioning system (GPS) signals and communicate through Bluetooth™, whereby when the vehicle and the mobile phone come within a certain distance of one another, the mobile phone automatically opens the vehicle door, and when the vehicle and the mobile phone are separated by a certain distance, the mobile phone automatically closes the vehicle door.

However, in this prior art, the location of the vehicle is determined through a GPS signal, so when the vehicle is in an area such as the basement of a building in which vehicles are mostly parked and a GPS signal is not received, the technique is not substantially available. In addition, there is a probability of malfunction resulting from an error range of the GPS signal, and because the vehicle door is opened and closed based on information transmitted or received through Bluetooth™, a security problem arises.

SUMMARY OF THE INVENTION

An aspect of the present invention provides a telematics system using human body communication capable of improving security and user convenience.

Another aspect of the present invention provides a portable device having a telematics function using human body communication capable of improving security and user convenience.

Another aspect of the present invention provides a method for providing a telematics service using human body communication capable of improving security and user convenience.

According to an aspect of the present invention, there is provided a telematics system using human body communication, including: a vehicle receiving an authentication key from at least one portable device through human body communication using a human body as a medium, and controlling the opening and closing of a door of the vehicle based on whether or not the received authentication key is valid; and a first portable device transmitting a first authentication key through a user's body in contact with the vehicle.

The telematics system using human body communication may further include: a second portable device transmitting a second authentication key to the vehicle through the user's body in contact with the vehicle, wherein the vehicle checks the validity of the first and second authentication keys, and when both the first and second authentication keys are valid, the door of the vehicle is opened.

When the user's body is in contact with a start manipulation unit for starting the vehicle, at least one of the first and second authentication keys may be received through the user's body, and when the received at least one of the authentication keys is valid, the vehicle may be started.

The vehicle may store at least one of information regarding an impact applied to the vehicle and information regarding a break-in attempt to the vehicle in a parked state, and when the authentication key is valid, the vehicle may transmit at least one of the stored vehicle impact information and the break-in attempt information to the first portable device through the user's body, when an accident happens while the vehicle is running (or driving), the vehicle may transmit accident information to the first portable device through the user's body, and when the engine of the vehicle is stopped, the vehicle may transmit vehicle travel information to the first portable device through the user's body.

The vehicle may compare the first authentication key with a plurality of stored authentication keys to recognize (identify, discriminate or distinguish) a user corresponding to the first authentication key, and execute a function corresponding to the recognized user based on configuration information corresponding to the recognized user.

The vehicle may receive data from the first portable device through the user's body and synchronize the data with content of stored data.

The vehicle and the first portable device may provide a hands-free function by transmitting and receiving a voice signal and a call control signal through the user's body.

Another aspect of the present invention provides a portable device having a telematics function using human body communication, including: a controller reading and providing a stored authentication key when a user's body comes into contact with a vehicle; a human body communication unit converting the provided authentication key into a signal available for human body communication; an electrode transmitting a signal provided from the human body communication unit to the vehicle through the user's body; and a storage unit storing the authentication key.

The portable device may further include: a display unit displaying information transmitted through the user's body from the vehicle under the control of the controller; and a mobile communication unit transmitting a message including the information transmitted through the user's body from the vehicle to a pre-set destination.

When a call or a message is received through the mobile communication unit, the controller may transmit call or message reception information to the vehicle through the user's body.

The storage unit may store user's personal information including a phone number and a speed dial number (i.e., an abbreviated number), and when the user's body comes into contact with the vehicle, the storage unit may transmit the stored user's personal information to the vehicle through the user's body.

Another aspect of the present invention provides a method for providing a telematics service of a system in which a vehicle and at least one portable device communicate by using human body communication, including: transmitting, by a first portable device, a first authentication key to the vehicle through a user's body; and determining, by the vehicle, the validity of the first authentication key, and opening a door of the vehicle when the first authentication key is valid.

The method may further include: transmitting, by a second portable device, a second authentication key to the vehicle through the user's body; and determining, by the vehicle, the validity of the second authentication key and opening the door of the vehicle when both the first and second authentication keys are valid.

The method may further include: transmitting, by the vehicle, information regarding an impact applied to the vehicle in a parked state and information regarding a break-in attempt to the vehicle to at least one of the first and second portable devices, after the operation of opening the door of the vehicle; and displaying, by any one of the first and second portable devices which has received the vehicle impact information or the break-in attempt information, the received information.

The method may further include: recognizing, by the vehicle, the user based on at least one of the first and second authentication keys, after the operation of opening the door of the vehicle; acquiring configuration information of the vehicle corresponding to the recognized user; and executing a function of the vehicle based on the acquired configuration information of the vehicle.

The method may further include: when the user comes into contact with a start manipulation unit for starting the vehicle, providing, by the first and second portable devices, the first and second authentication keys, respectively, after the operation of opening the door of the vehicle; and when both the first and second authentication keys are valid, starting the engine by the vehicle (or executing starting by the vehicle).

The method may further include: transmitting, by at least one of the first and second portable devices, stored data to the vehicle through the user's body, after the operation of starting is executed; and synchronizing, by the vehicle, the data transmitted from at least one of the first and second portable devices with stored data.

The method may further include: when the vehicle detects an accident while driving, transmitting, by the vehicle, the accident information to at least one of the first and second portable devices through the user's body, after the operation of starting is executed; and transmitting, by any one of the first and second portable devices which has received the accident information, the accident information to a pre-set destination.

The method may further include: when the engine of the vehicle stops, transmitting, by the vehicle, vehicle travel information to at least one of the first and second portable devices through the user's body, after the operation of starting is executed; and displaying, by any one of the first and second portable devices which has received the vehicle travel information, the vehicle travel information.

The method may further include: transmitting, by any one of the first and second portable devices, call reception information to the vehicle through the user's body, after the operation of starting is executed; and when the user uses a hands-free installed in the vehicle, transmitting and receiving a call voice between the vehicle and the portable device which has received the call.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
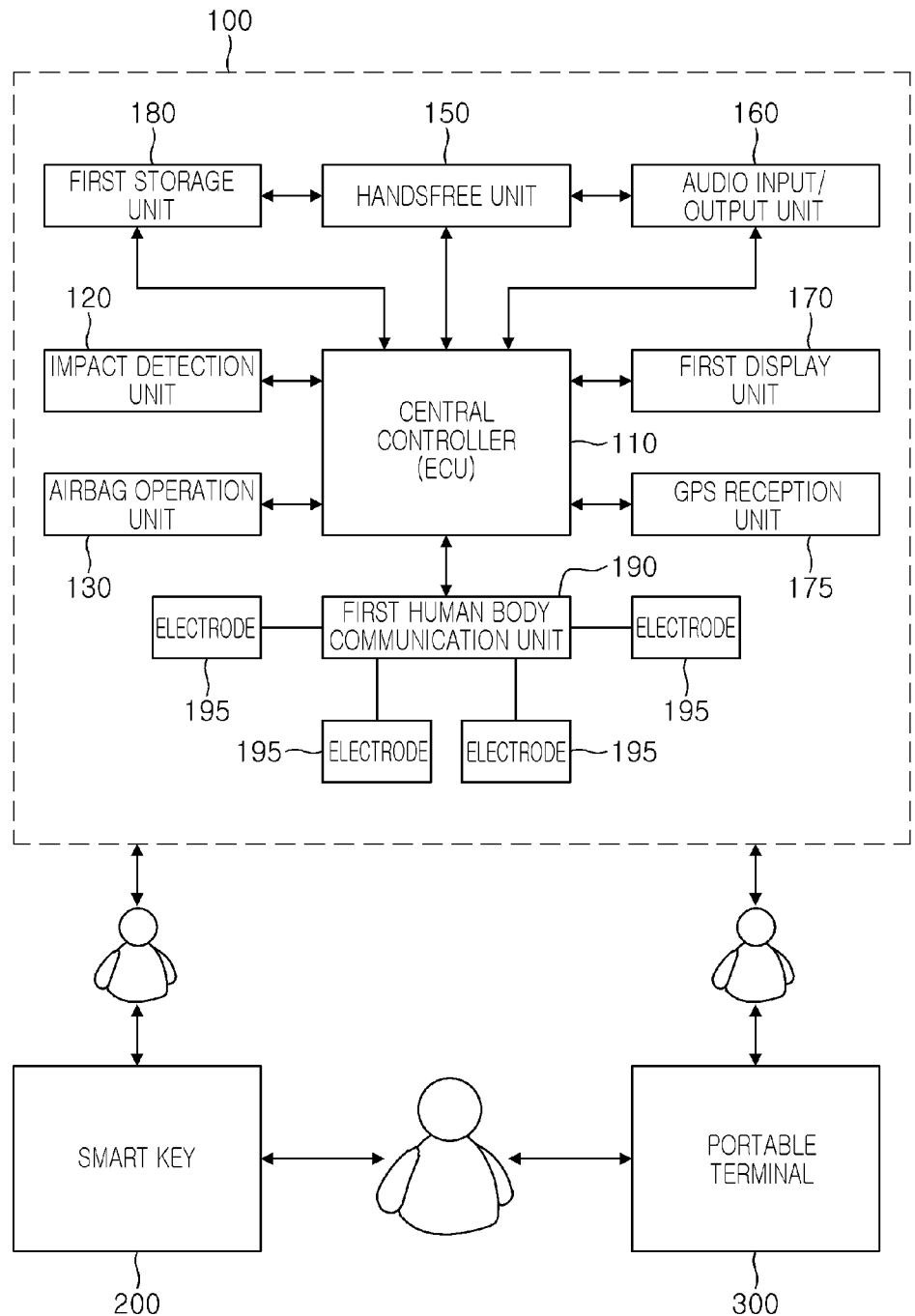
FIG. 1 is a schematic block diagram of a telematics system using human body communication according to an exemplary embodiment of the present invention.

The present invention may be modified variably and may have various embodiments, particular ones of which will be illustrated in drawings and described in detail.

However, it should be understood that the following exemplifying description of the invention is not intended to restrict the invention to specific forms of the present invention but rather the present invention is meant to cover all modifications, similarities and alternatives which are included in the spirit and scope of the present invention.

While such terms as "first" and "second," etc., may be used to describe various components, such components must not be limited to the above terms. The above terms are used only to distinguish one component from another. For example, a first component may be referred to as a second component without departing from the scope of rights of the present invention, and likewise a second component may be referred to as a first component. The term "and/or" encompasses both combinations of the plurality of related items disclosed and any item from among the plurality of related items disclosed.

When a component is mentioned as being "connected" to or "accessing" another component, this may mean that it is directly connected to or accessing the other component, but it is to be understood that another component may exist therebetween. On the other hand, when a component is mentioned as being "directly connected" to or "directly accessing" another component, it is to be understood that there are no other components in-between.

The terms used in the present application are merely used to describe particular embodiments, and are not intended to limit the present invention. An expression used in the singular encompasses the expression of the plural, unless it has a clearly different meaning in the context. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted as having meanings equal to the contextual meanings in the relevant field of art, and are not to be interpreted as having ideal or excessively formal meanings unless clearly defined in the present application.

Embodiments of the present invention will be described below in detail with reference to the accompanying drawings, where those components are rendered the same reference number that are the same or are in correspondence, regardless of the figure number, and redundant explanations are omitted.

Figure 2:
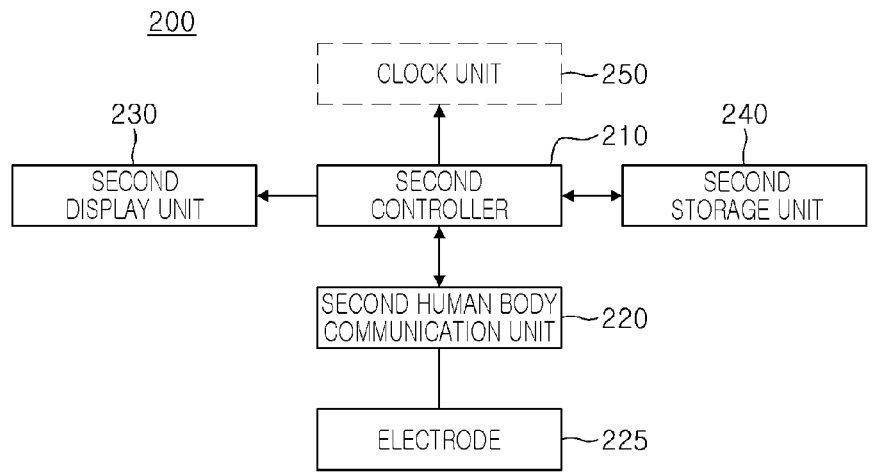
FIG. 2 is a schematic block diagram of a portable device having a telematics function using human body communication according to an exemplary embodiment of the present invention.
Figure 3:
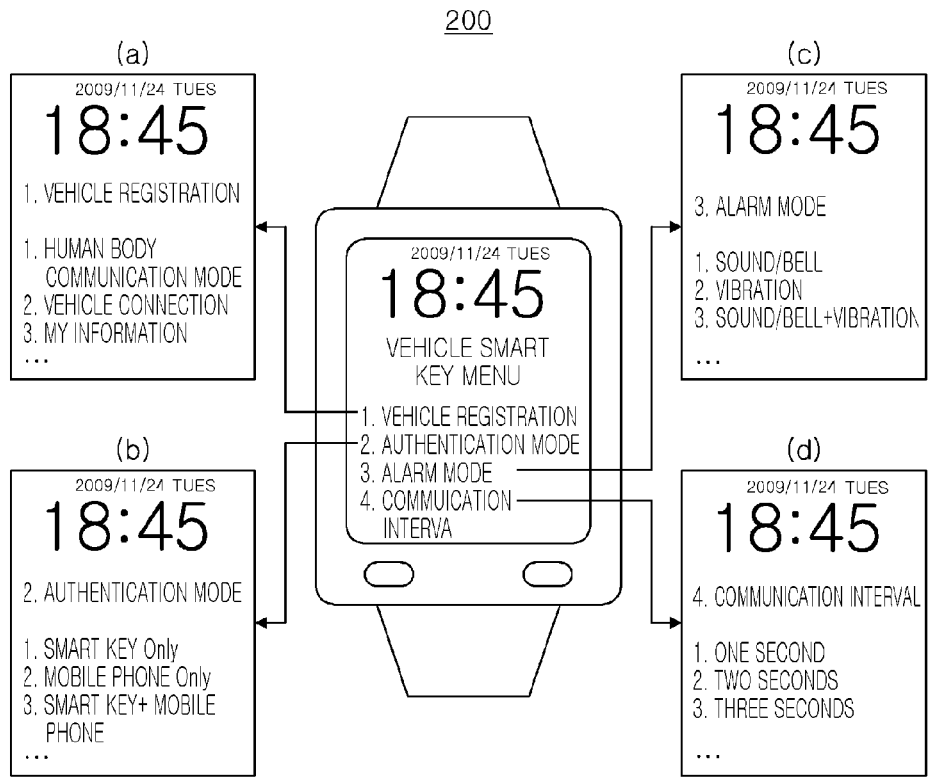
FIG. 3 shows a screen image of a user interface for a process of setting a smart key illustrated in FIG. 2.
Figure 4:
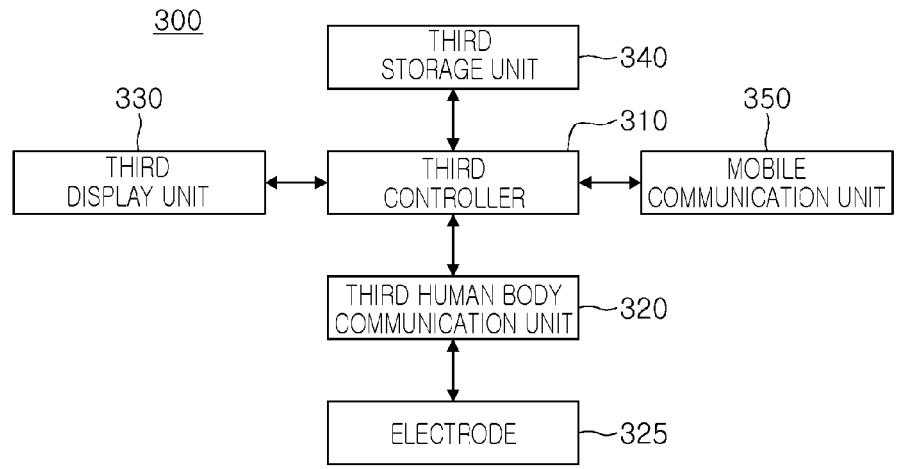
FIG. 4 is a schematic block diagram of a portable device having a telematics function using human body communication according to another exemplary embodiment of the present invention.
Figure 5:
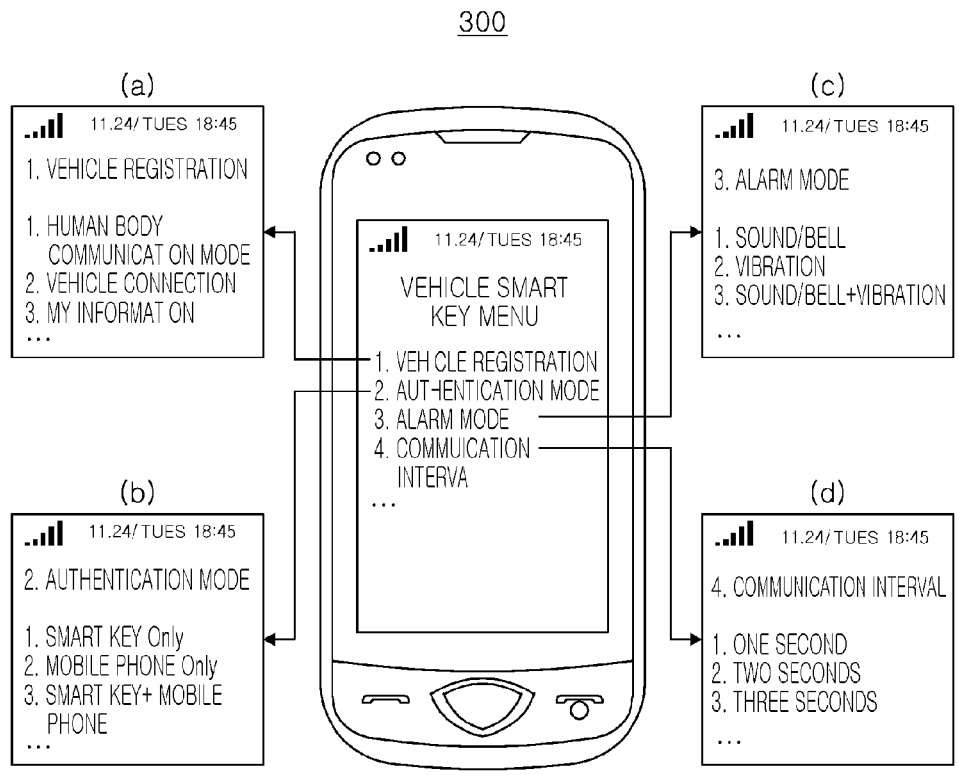
FIG. 5 shows screen images of a user interface for a process of setting a mobile terminal illustrated in FIG. 2.

FIG. 1 is a schematic block diagram of a telematics system using human body communication according to an exemplary embodiment of the present invention. FIG. 2 is a schematic block diagram of a portable device having a telematics function using human body communication according to an exemplary embodiment of the present invention. FIG. 3 shows a screen image of a user interface for a process of setting a smart key illustrated in FIG. 2. FIG. 4 is a schematic block diagram of a portable device having a telematics function using human body communication according to another exemplary embodiment of the present invention. FIG. 5 shows screen images of a user interface for a process of setting a smart key illustrated in FIG. 2.

With reference to FIGS. 1 to 5, a telematics system using human body communication according to an exemplary embodiment of the present invention may include a vehicle 100 and a portable device, and the portable device may be configured as, for example, a smart key 200 and a mobile terminal 300.

The vehicle 100 may include a central controller 110, an impact detection unit 120, an airbag operation unit 130, a handsfree unit 150, an audio (or sound) input/output unit 160, a first display unit 170, a GPS reception unit 175, a first storage unit 180, a first human body communication unit 190, and a plurality of electrodes 195.

The central controller 110 provides a telematics service by processing data transmitted to or received from the smart key 200 and the mobile terminal 300 through human body communication, and generally controls the vehicle 100.

In detail, when a smart key authentication key and a mobile terminal authentication key are provided from the smart key 200 and the mobile terminal 300, respectively, the central controller 110 compares the smart key authentication key and the mobile terminal authentication key with authentication keys stored in the first storage unit 180 to determine whether or not the smart key authentication key and the mobile terminal authentication key are valid, and controls to open and close a door of the vehicle and start the engine of the vehicle according to whether or not the smart key authentication key and the mobile terminal authentication key are valid.

In addition, while the vehicle is parked, the central controller 110 determines whether or not an impact has been applied based on a signal provided from the impact detection unit 120 and determines whether or not a break-in has been attempted based on a signal provided from a sensor (not shown) or the like installed in the door of the vehicle, stores vehicle impact information and break-in attempt information in the first storage unit 180, and provides control to transmit the vehicle impact information and break-in attempt information to the authentication-completed smart key 200 and/or mobile terminal 300.

In addition, after the authenticating of the smart key 200 and the mobile terminal 300 is completed, the central controller 110 compares the plurality of authentication keys stored in the first storage unit 180 with the smart key authentication key and the mobile terminal authentication key which have been provided from the smart key 200 and the mobile terminal 300 through human body communication in order to recognize (identify, discriminate or distinguish) the authenticated user, reads information configured (or set) by the recognized user from the first storage unit 180, and executes a pre-set function.

In addition, the central controller 110 receives data from the smart key 200 and/or the mobile terminal 300 through human body communication, and stores the received data in the first storage unit 180 or updates the data stored in the first storage unit 180, to thus synchronize data stored in the vehicle 100 and the data stored in the portable device (i.e., the smart key 200 or the mobile terminal 300).

In addition, when voice data or control data is provided from the handsfree unit 150 or the audio input/output unit 160, the central controller 110 provides the received data to the first human body communication unit 190, to thus provide the data to the portable device (i.e., the smart key 200 or the mobile terminal 300) through human body communication.

In addition, the central controller 110 detects whether or not the vehicle has an accident based on signals provided from the impact detection unit 120, the airbag operation unit 130, the GPS reception unit 175, or various sensors installed in the vehicle. When the central controller 110 determines that an accident has happened, the central controller 110 provides accident information to the first human body communication unit 190, thereby transmitting the accident information of the vehicle to the mobile terminal 300 through human body communication.

In addition, the central controller 110 collects vehicle travel information (e.g., a travel time, a travel distance, an average speed, an average mileage, a travel available distance, etc.), and when it is determined that the user's body is brought into contact with the electrode 195 installed in an internal handle in a state in which the engine of the vehicle is stopped, the central controller 110 provides the vehicle travel information to the first human body communication unit 190, thereby providing the vehicle travel information to the portable device (i.e., the smart key 200 or the mobile terminal 300) through human body communication.

The impact detection unit 120 detects an impact applied to the vehicle and provides a corresponding impact signal to the central controller 110.

When an airbag operates because of an impact applied to the vehicle or a vehicle accident, the airbag operation unit 130 provides an airbag operation signal to the central controller 110.

The handsfree unit 150 outputs a voice signal provided under the control of the central controller 110 to the audio input/output unit 160 (e.g., a speaker), and processes a user voice provided through the audio input/output unit 160 (e.g., a microphone) and provides the processed voice to the central controller 110. In addition, the handsfree unit 150 includes manipulation buttons and activates or deactivates its handsfree function according to user manipulation of the buttons.

The handsfree unit 150 may include a non-volatile memory. After the non-volatile memory of the handsfree unit 150 stores user's personal information (e.g., a phone number or a speed dial number) provided from the mobile terminal 300 through human body communication, when the handsfree function is activated according to a user manipulation, the handsfree unit 150 displays the stored phone book and/or speed dial numbers on the first display unit 170. When the user selects a certain phone number or a speed dial number to make a call, the handsfree unit 150 provides the user selected information and a call connection signal to the central controller 110, thereby transmitting the user selected information and the call connection signal to the mobile terminal 300 through human body communication.

The audio input/output unit 160, which may include a speaker and a microphone, outputs the audio signal provided from the handsfree unit 150 or the central controller 110 through the speaker, or receives a voice signal from the user through the microphone, processes the received voice signal, and provides the processed signal to the handsfree unit 150 or the central controller 110.

The first display unit 170 displays information related to the running of the vehicle 110 and information related to execution of the telematics service under the control of the controller 110.

The GPS reception unit 175 receives a GPS signal, acquires location information of the vehicle 100 based on the received signal, and provides the acquired location information to the central controller 110.

The first storage unit 180 stores information related to unique operation of the vehicle 100 and data (e.g., an authentication key, a phone book, a speed dial number, alert information during parking, travel information, user set information, etc.) generated in the process of executing the telematics service, under the control of the central controller 110.

The first human body communication unit 190 processes the data provided from the central controller 110 according to a human body communication protocol to convert it into a signal available for human body communication and provides the converted signal to the plurality of electrodes 195, and converts signals received through the plurality of electrodes 195 into data that can be recognized by the central controller 110 and then provides the converted data to the central controller 110.

The plurality of electrodes 195, which are installed within or outside the vehicle 100, transmits signals provided from the first human body communication unit 190 through the user's body. For example, the plurality of electrodes 195 may be installed in an external handle, a start button, a steering wheel, or an internal handle of the vehicle 100 which are frequently contacted by the user's body.

The constitution of the vehicle 100 illustrated in FIG. 1 is based on the elements related to the telematics service, but, obviously, the vehicle 100 may further include various other elements for performing unique operation or controlling of the vehicle in addition to those illustrated in FIG. 1.

FIG. 2 is a schematic block diagram of a portable device, specifically, the smart key 200, having a telematics function using human body communication according to an exemplary embodiment of the present invention.

The smart key 200 may include a second controller 210, a second human body communication unit 220, an electrode 225, a second display unit 230, and a second storage unit 240.

The second controller 210 displays a user interface for setting the function of the smart key 200 on the display unit 230 and stores set function information provided from the user in the second storage unit 240. Thereafter, when the telematics service is performed, the second controller 210 control the operation of the smart key 200 based on the set function information.

In addition, the second controller 210 performs controlling to perform human body communication with the vehicle 100 or the mobile terminal 200 through the second human body communication unit 220.

In detail, the second controller 210 reads the smart key authentication key stored in the second storage unit 240 and provides the read smart key authentication key to the second human body communication unit 220, so as for the smart key authentication key to be provided to the vehicle 100 through human body communication. When vehicle impact information, break-in attempt information, vehicle accident information, or vehicle travel information is provided from the vehicle 100 through human body communication, the second controller 210 displays the provided information on the second display unit 230.

In addition, the second controller 210 performs human body communication with the mobile terminal 300 at pre-set communication intervals. When the second controller 210 determines that human body communication is not performed, the second controller 210 outputs an alarm signal to the second display unit 230 or a separate alarm signal output unit (not shown).

The second human body communication unit 220 processes the data, which has been provided from the second controller 210, according to a human body communication protocol to convert it into a signal available for human body communication and provides the converted signal to the electrode 225, and converts a signal received through the electrode 225 into data that can be recognized by the second controller 210 and then provides the converted data to the second controller 210.

The electrode 225, which is installed at a position that can be contacted by the user's body, transmits the signal provided from the second human body communication 220 through the user's body, and provides a signal received from the user's body to the second human body communication unit 220.

The second display unit 230 displays the provided information under the control of the second controller 210.

The second storage unit 240 stores the smart key authentication key and also stores the data provided from the vehicle 100 or the mobile terminal 300 through human body communication under the control of the second controller 210.

The smart key 200 illustrated in FIG. 2 may be implemented in the form of, for example, a wristwatch, and in this case, the smart key 200 may further include a clock unit 250.

FIG. 3 shows a screen image of a user interface for a process of setting a smart key illustrated in FIG. 2.

With reference to FIG. 3, the smart key 200 according to an exemplary embodiment of the present invention may include the functions of 'vehicle registration' (a), 'authentication mode' (b), 'alarm mode' (c), and 'communication interval' (d) as telematics functions.

The function of 'vehicle registration' (a) includes a 'human body communication mode' menu for setting whether or not the smart key is to be used as a smart key of the vehicle using human body communication, a 'vehicle connection' menu for exchanging a smart key authentication key with the vehicle at an initial stage when the smart key is set to be used as a smart key of the vehicle using human body communication, and a 'my information' menu for viewing information related to a vehicle registration. In this case, as the smart key authentication key determined in the 'vehicle connection' menu, an authentication key provided from the vehicle may be used.

The 'authentication mode' (b) function is for setting a device related to a user authentication, which includes a 'smart key only' menu for authenticating the vehicle only with the smart key, a 'mobile phone only' menu for authenticating the vehicle only with the mobile phone, and a 'smart key+mobile phone' menu for authenticating the vehicle by using both the smart key and the mobile terminal. Here, in the case in which the 'smart key+mobile phone' menu is set, when the user comes into contact with the external handle of the vehicle 100 in order to get on the vehicle 100, the smart key 200 and the mobile terminal 300 transmit the smart key authentication key and the mobile terminal authentication key to the vehicle 100 through human body communication, respectively.

The 'alarm mode' (c) function is for setting a method for displaying an alarm signal received from the vehicle 100 through human body communication, which includes a 'sound/bell' menu for transferring a sound or bell when an alarm signal is received, a 'vibration' menu for outputting an alarm signal through vibration of the smart key 200, and a 'sound/bell+vibration' menu for outputting an alarm signal through a sound or bell and vibration.

The 'communication interval' (d) function is for a setting to reduce power consumption of the second human body communication unit, which includes a menu for setting one of pre-set communication intervals (e.g., one second, two seconds, three seconds, etc.). Here, the communication interval refers to a duration in which human body communication transitions from a deactivated state to an activated state.

FIG. 4 is a schematic block diagram of a portable device, specifically, the mobile terminal, having a telematics function using human body communication according to another exemplary embodiment of the present invention.

With reference to FIG. 4, the mobile terminal 300 includes a third controller 310, a third human body communication unit 320, an electrode 325, a third display unit 330, a third storage unit 340, and a mobile communication unit 350.

The third controller 310 displays a user interface for setting the function related to telematics on the third display unit 330 and stores information regarding a set function provided from the user in the third storage unit 340. Thereafter, when the telematics service is performed, the third controller 310 controls the mobile terminal based on the set function information.

In addition, the third controller 310 performs controlling to perform human body communication with the vehicle 100 or the smart key 200 through the third human body communication unit 320.

In detail, the third controller 310 reads the mobile terminal authentication key stored in the third storage unit 340 and provides the read mobile terminal authentication key to the third human body communication unit 220, so as for the mobile terminal authentication key to be provided to the vehicle 100 through human body communication. When vehicle impact information, break-in attempt information, vehicle accident information, or vehicle travel information is provided from the vehicle 100 through human body communication, the third controller 210 displays the provided information on the third display unit 330.

In particular, when accident information is transmitted through human body communication, the third controller 310 transmits a message including the accident information to a pre-set destination. Here, the third controller 310 may transmit a short message service (SMS) message including the accident information to the pre-set destination through the mobile communication unit 350.

In addition, when authentication with the vehicle is completed, the third controller 310 may read user's personal information (e.g., a phone book, a speed dial number, etc.) stored in the third storage unit 340 and provide the same to the third human body communication unit 320, thus performing data synchronization between the mobile terminal and the vehicle.

In addition, when a call is received, the third controller 310 transmits call reception information, a received phone number, and the like, to the vehicle through the third human body communication unit 320, and when call communication is performed, the third controller 310 transmits and receives a call voice to and from the vehicle. When a call request is provided from the vehicle through human body communication, the third controller 310 performs a call connection to a corresponding phone number.

In addition, the third controller 310 performs human body communication with the smart key 200 at pre-set communication intervals. When the third controller 310 determines that human body communication is not performed, the third controller 310 outputs an alarm signal to the third display unit 330 or a separate alarm signal output unit (not shown).

The third human body communication unit 320 processes the data, which has been provided from the third controller 310, according to a human body communication protocol to convert it into a signal available for human body communication and provides the converted signal to the electrode 325, and converts a signal received through the electrode 325 into data that can be recognized by the third controller 310 and then provides the converted data to the third controller 310.

The electrode 325, which is installed at a position that can be contacted by the user's body, transmits the signal provided from the third human body communication 320 through the user's body, and provides a signal received from the user's body to the third human body communication unit 320.

The third display unit 330 displays the provided information under the control of the third controller 310.

The third storage unit 340 stores the mobile terminal authentication key, the phone number, the speed dial number, etc., and also stores the data provided from the vehicle or the smart key through human body communication under the control of the third controller 310.

The mobile communication unit 350 may be implemented according to known communication techniques such as WCDMA, HSDPA, WiBRO, and the like, and transmits and receives a voice call, a video call, or a text message under the control of the third controller 310.

FIG. 5 shows screen images of a user interface for a process of setting the mobile terminal illustrated in FIG. 2.

With reference to FIG. 5, the mobile terminal 300 according to an exemplary embodiment of the present invention may include functions of 'vehicle registration' (a), 'authentication mode' (b), 'alarm mode' (c), and 'communication interval' (d) as telematics functions.

The function of 'vehicle registration' (a) includes a 'human body communication mode' menu for setting whether or not the mobile terminal 300 is to be used as a smart key of the vehicle using human body communication, a 'vehicle connection' menu for exchanging a smart key authentication key with the vehicle at an initial stage when the mobile terminal 300 is set to be used as a smart key of the vehicle using human body communication, and a 'my information' menu for viewing information related to a vehicle registration. In this case, as the mobile terminal authentication key determined in the 'vehicle connection' menu, a phone number of the mobile terminal, a serial number of the mobile terminal, or an authentication key provided from the vehicle may be used.

The 'authentication mode' (b) function is for setting a device related to a user authentication, which includes a 'smart key only' menu for authenticating the vehicle only with the smart key, a 'mobile phone only' menu for authenticating the vehicle only with the mobile phone, and a 'smart key+mobile phone' menu for authenticating the vehicle by using both the smart key and the mobile terminal. Here, in the case in which the 'smart key+mobile phone' menu is set, when the user comes into contact with the external handle of the vehicle 100 in order to get on the vehicle 100, the smart key 200 and the mobile terminal 300 transmit the smart key authentication key and the mobile terminal authentication key to the vehicle 100 through human body communication, respectively.

The 'alarm mode' (c) function is for setting a method for displaying an alarm signal received from the vehicle 100 through human body communication, which includes a 'sound/bell' menu for transferring a sound or bell when an alarm signal is received, a 'vibration' menu for outputting an alarm signal through vibration of the smart key 200, and a 'sound/bell+vibration' menu for outputting an alarm signal through a sound or bell and vibration.

The 'communication interval' (d) function is for setting to reduce power consumption of the third human body communication unit, which includes a menu for setting one of pre-set communication intervals (e.g., one second, two seconds, three seconds, etc.).

In the exemplary embodiments illustrated in FIGS. 1 to 5, the detailed constitutions and functions of the first to third human body communication units 190, 220, and 320 may be configured by applying the technique disclosed in Korean Patent No. 835175 (Title of the invention: Digital Communication System and Method using Frequency Selective Baseband) or Korean Patent No. 912543 (Title of the invention: Modulation and Demodulation Method and Apparatus using Frequency Selective Baseband). For example, the first to third human body communication units 190, 220, and 320 may perform spreading on input data by using a spreading code corresponding to a dominant frequency existing in a frequency band.

In addition, the smart key performing human body communication with the vehicle in FIGS. 2 and 3 is illustrated to be configured in the form of a clock, but the present invention is not limited thereto. Namely, the smart key may be implemented in various portable forms that can be carried around by the user, and in particular, the other elements (e.g., the second human body communication unit and the electrode) illustrated in FIG. 2 may be installed also in the related art remote controller type smart key without a display unit so as to be used.

Figure 6:
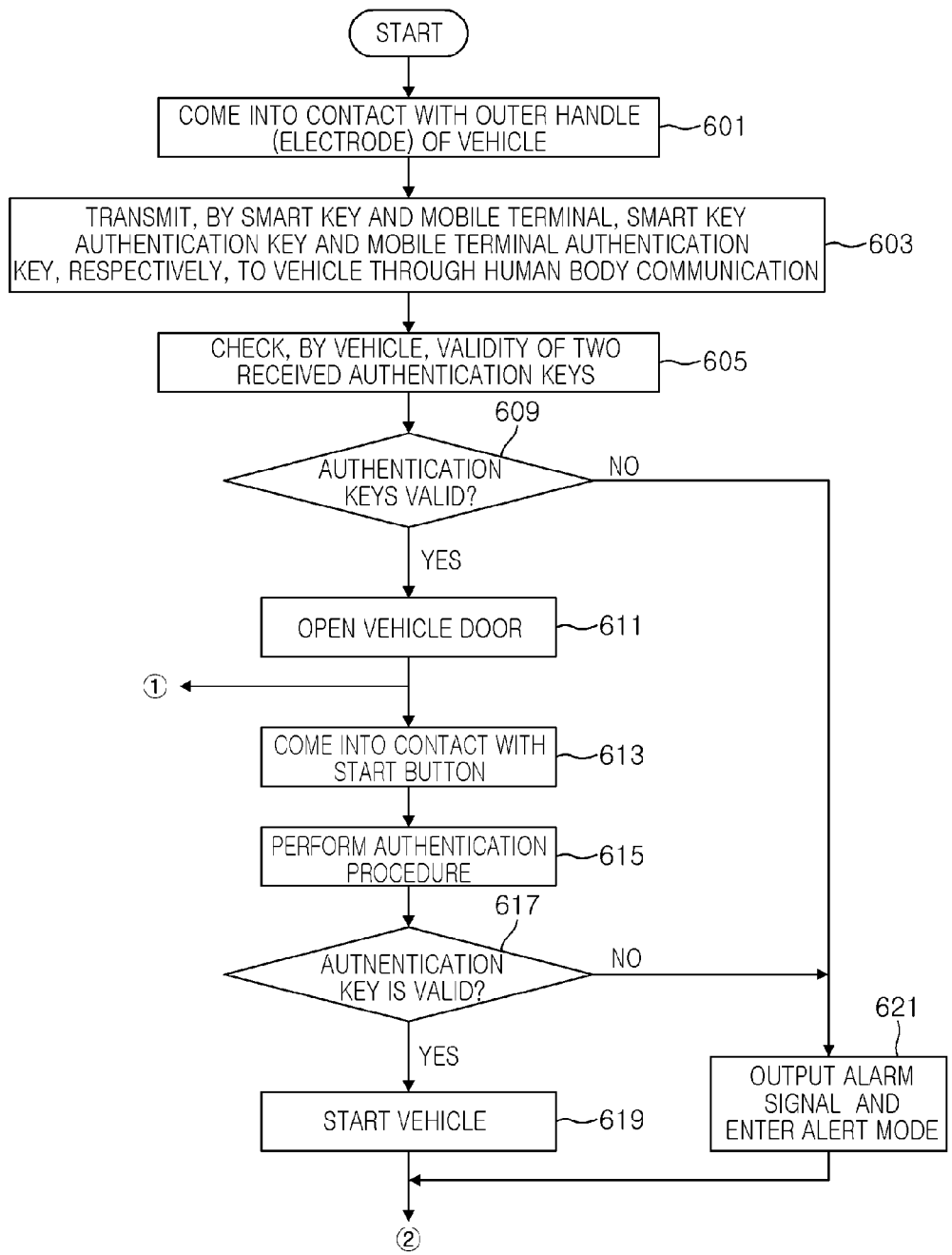
FIG. 6 is a flow chart illustrating the process of a method for providing a telematics service using human body communication according to an exemplary embodiment of the present invention, specifically illustrating the process of executing a user authentication and a vehicle security function.

FIG. 6 is a flow chart illustrating the process of a method for providing a telematics service using human body communication according to an exemplary embodiment of the present invention, specifically illustrating the process of executing a user authentication and a vehicle security function.

With reference to FIG. 6, when the user, who is carrying around the smart key and the mobile terminal, comes into contact with an electrode installed in the external handle of the vehicle (step 601), the smart key and the mobile terminal transmit a smart key authentication key and a mobile terminal authentication key to the vehicle through human body communication respectively (step 603). Here, the smart key may transmit the smart key authentication key retained according to a vehicle registration to the vehicle, and the mobile terminal may transmit the mobile terminal authentication key acquired through its vehicle connection to the vehicle.

The vehicle checks the validity of the authentication keys received through human body communication from the smart key and the mobile terminal (step 605). When the two received authentication keys are determined to be valid (step 609), the vehicle opens its door (step 611). Here, the vehicle may check the validity of the authentication keys by comparing previously stored authentication keys and the received authentication keys.

With the vehicle door opened, when the user gets on the vehicle and comes into contact with an electrode installed in the start button (step 613), the smart key and the mobile terminal transmit the smart key authentication key and the mobile terminal authentication key through human body communication in the same manner as in step 603, respectively, and the vehicle performs an authentication procedure of checking the validity of the two received authentication keys (step 615). When the two received authentication keys are determined to be valid (step 617), the vehicle starts its engine (step 619).

Meanwhile, when the authentication keys are determined to be invalid in step 609 or step 617, the vehicle outputs an alarm signal and enters an alert mode (step 621).

As shown in FIG. 6, in the user authentication and vehicle security process according to an exemplary embodiment of the present invention, because the smart key authentication key and the mobile terminal authentication key are all used to doubly perform authentication, security can be further strengthened. In addition, it may be configured such that only one of the smart key authentication key and the mobile terminal authentication key is used according to a user convenience, and this may be determined by setting the 'authentication mode' function on the screen images of the user interfaces illustrated in FIGS. 3 and 5.

Figure 7:
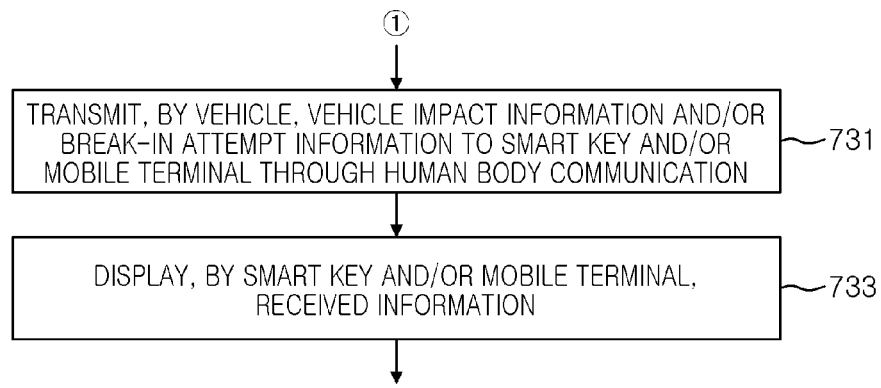
FIG. 7 is a flow chart illustrating the process of a method for providing a telematics service using human body communication according to another exemplary embodiment of the present invention, specifically illustrating the process of executing an operation alert information notification function during parking.
Figure 8:
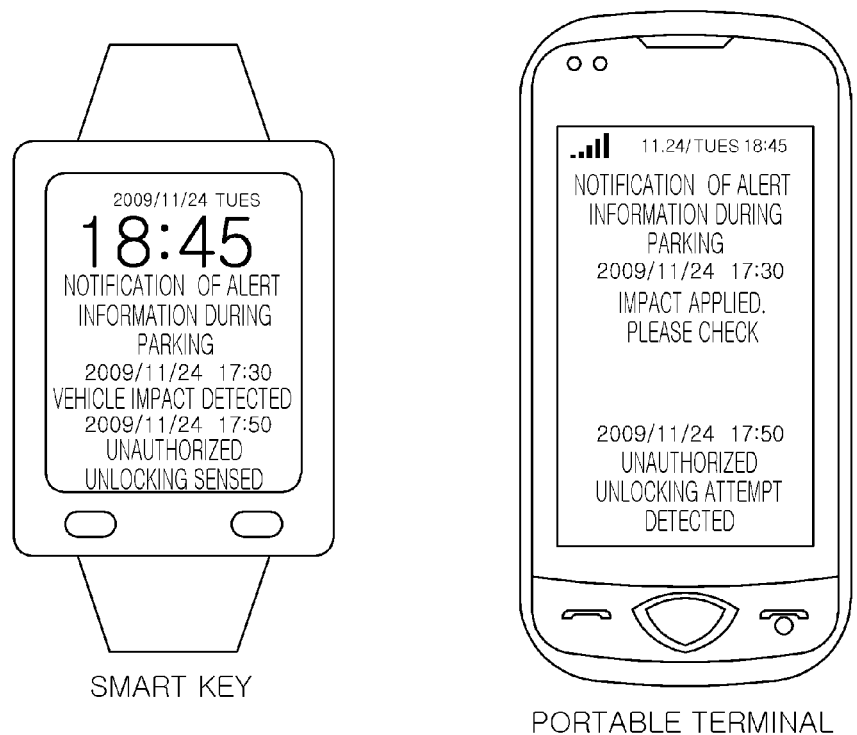
FIG. 8 shows screen images of a user interface displayed in the process of executing the operation alert information notification function during parking illustrated in FIG. 7.

FIG. 7 is a flow chart illustrating the process of a method for providing a telematics service using human body communication according to another exemplary embodiment of the present invention, specifically illustrating the process of executing an operation alert information notification function during parking. FIG. 8 shows screen images of a user interface displayed in the process of executing the operation alert information notification function during parking illustrated in FIG. 7.

With reference to FIGS. 7 and 8, when the door of the vehicle is opened by performing steps 601 to 611 illustrated in FIG. 6, the vehicle simultaneously transmit vehicle impact information and/or break-in attempt information, alert information during parking stored while the vehicle is parked to the smart key and the mobile terminal contacted by the user's body through human body communication (step 731). To this end, the vehicle, while it is parked, detects an impact applied from the exterior by means of the impact detection unit and provides impact detection information (e.g., an impact detection time, the number of times of impact detections, an impact strength, etc.) to the central controller so that the central control may store the same in the storage unit. Also, when unlocking of the door of the vehicle is forcibly attempted by an non-authorized user, the central controller stores break-in attempt information (e.g., a break-in attempt time, the number of times of break-in attempts, etc.) in the storage unit.

When the impact detection information and/or the break-in attempt information are provided from the vehicle through human body communication, the smart key and/or the mobile terminal displays the provided impact detection information and/or break-in attempt information on the display unit (step 733) as shown in FIG. 8.

As shown in FIGS. 7 and 8, in the process of providing operation alert information during parking, when the vehicle is damaged due to an impact applied thereto while being parked, the impact detection information and/or break-in attempt information generated during parking are provided to the user through human body communication at a time point when the door of the vehicle is opened in order to prevent the user from missing it without noticing. Thus, the user can take a measure such as recognition of the degree of the vehicle damage, an accident report, checking the CCTV of the parking lot, and the like, and accordingly, the user can cope with a vehicle terror in time.

Figure 9:
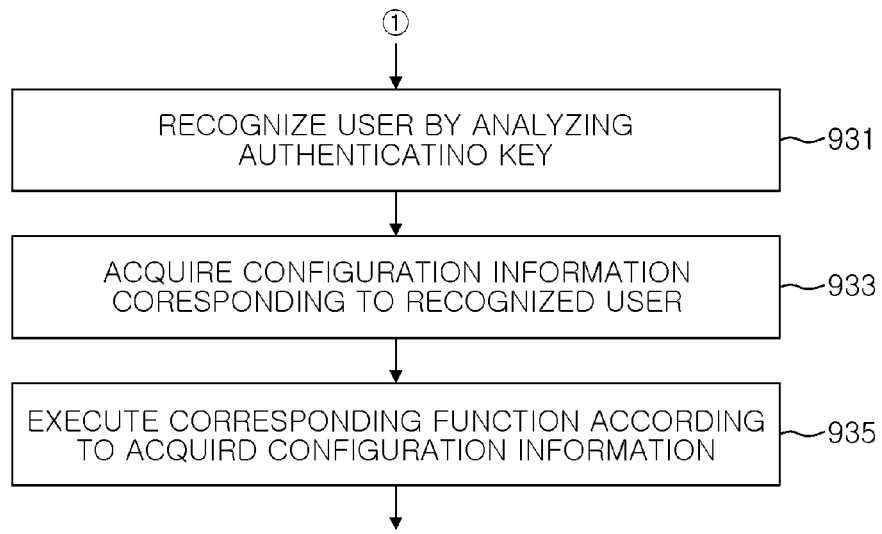
FIG. 9 is a flow chart illustrating the process of a method for providing a telematics service using human body communication according to another exemplary embodiment of the present invention, specifically illustrating the process of executing a customized service function.

FIG. 9 is a flow chart illustrating the process of a method for providing a telematics service using human body communication according to another exemplary embodiment of the present invention, specifically illustrating the process of executing a customized service function.

With reference to FIG. 9, in the process of executing a customized service function according to another exemplary embodiment of the present invention, a function of authenticating a user who has been in contact with the vehicle and a function of recognizing a particular authenticated user when a plurality of users are authenticated.

For example, when authenticated first user (for example, a husband) and second user (for example, a wife) carry around a smart key and a mobile terminal and complete a vehicle registration procedure, the vehicle analyzes an authentication key transmitted by the contact user through human body communication to recognize the contact user and executes functions set for each user.

In detail, in a state that the door of the vehicle is opened upon completion of user authentication in steps 601 to 611 of FIG. 6, the vehicle compares the smart key authentication key and the mobile terminal authentication key transmitted from the smart key and the mobile terminal held by the user with stored authentication keys of a plurality of users to recognize the user which is currently in contact (step 931).

Thereafter, the vehicle reads set information corresponding to the recognized user from the storage unit (step 933) and executes a pertinent function corresponding to the read set information (step 935).

Here, the function executed for each user may be, for example, providing a welcome sound (e.g., 'Hello sir, be safe while driving today') including the name of the recognized user after the door of the vehicle is opened, operating a customized automatic driving posture memory system, customized setting a vehicle audio device such as a user preferred radio program or a music folder selection, setting a customized vehicle indoor temperature, and the like.

Figure 10:
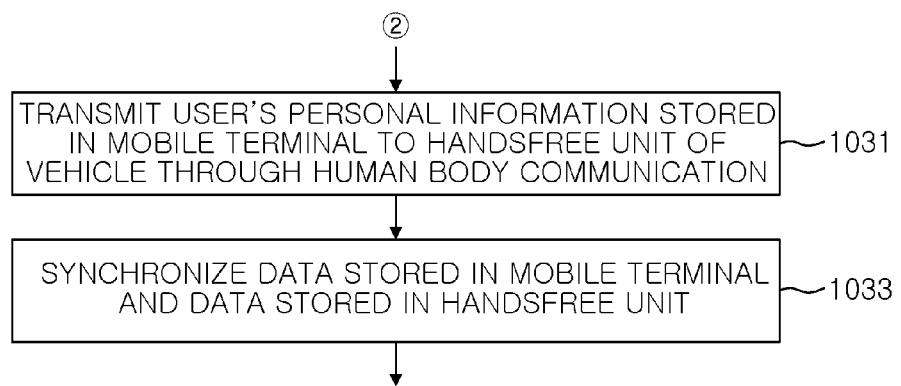
FIG. 10 is a flow chart illustrating the process of a method for providing a telematics service using human body communication according to another exemplary embodiment of the present invention, specifically illustrating the process of executing a data synchronization function between a mobile terminal and a vehicle.

FIG. 10 is a flow chart illustrating the process of a method for providing a telematics service using human body communication according to another exemplary embodiment of the present invention, specifically illustrating the process of executing a data synchronization function between a mobile terminal and a vehicle.

With reference to FIG. 10, when the engine of the vehicle is started in steps 601 to 619 of FIG. 6, the mobile terminal simultaneously transmits the user personal information such as the phone book, the speed dial number, and the like, as stored to the handsfree unit of the vehicle through the user's body in contact with the start button (step 1031).

Thereafter, data stored in the handsfree unit of the vehicle and the data stored in the mobile terminal are synchronized (step 1033). For example, when the user adds, alters, or deletes a phone number or a speed dial number in the mobile terminal, the data stored in the handsfree unit of the vehicle is also automatically updated by using the data synchronization function as mentioned above.

As shown in FIG. 10, in the process of synchronizing data between the mobile terminal and the vehicle according to another exemplary embodiment of the present invention, the fact that the user largely (or frequently) uses speed dial numbers, rather than phone numbers, is considered. Namely, when the user comes into contact with the start button of the vehicle, data of the phone book and speed dial numbers stored in the mobile terminal is transmitted to the handsfree unit of the vehicle through human body communication, thereby eliminating user inconvenience that the user inputs the phone book and the speed dial numbers to the handsfree unit of the vehicle and updates them one by one.

Figure 11:
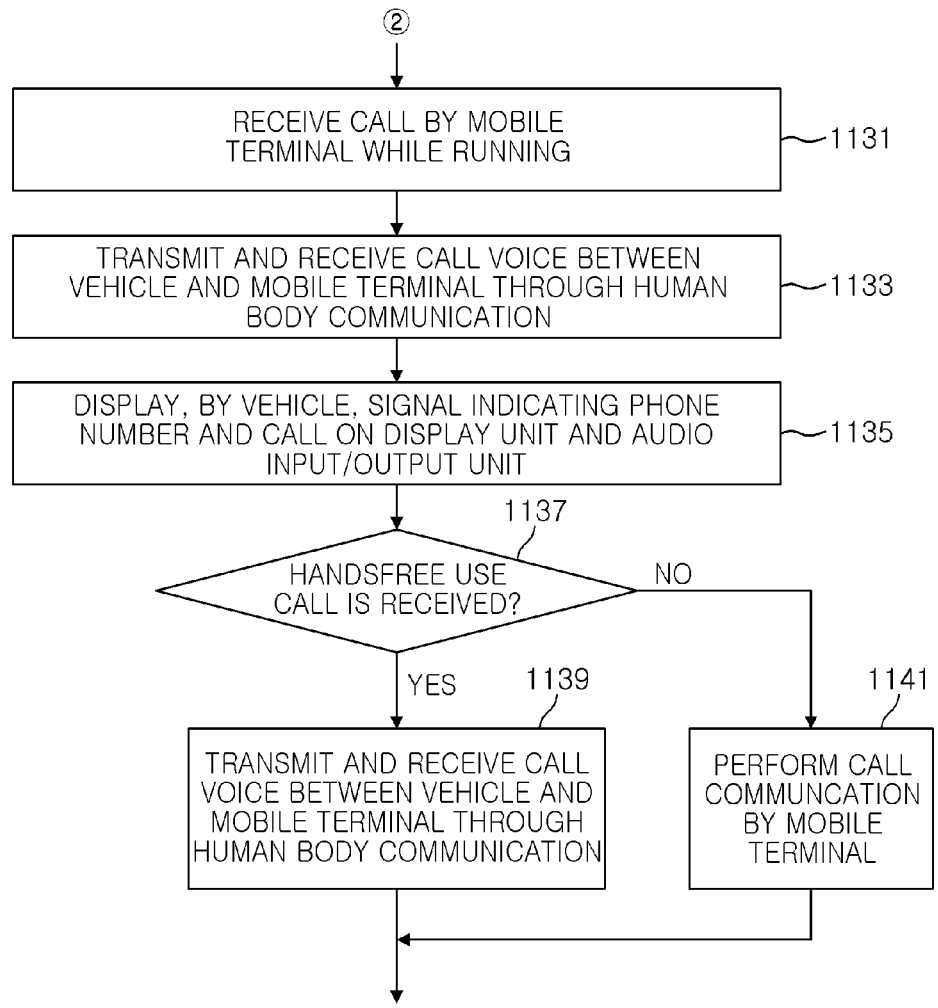
FIG. 11 is a flow chart illustrating the process of a method for providing a telematics service using human body communication according to another exemplary embodiment of the present invention, specifically illustrating the process of executing a handsfree function while a vehicle is traveling.

FIG. 11 is a flow chart illustrating the process of a method for providing a telematics service using human body communication according to another exemplary embodiment of the present invention, specifically illustrating the process of executing the handsfree function while the vehicle is traveling.

With reference to FIG. 11, in a state that the engine of the vehicle is started by performing steps 601 to 619 of FIG. 6, when a call is received by the mobile terminal while traveling (step 1131), the mobile terminal transmits a phone number of the received call and a message indicating the call reception to the vehicle through the user's body in contact with the electrode installed in the handle of the vehicle (step 1133).

The vehicle displays the phone number and the call reception message, which have been received from the mobile terminal, through the audio output unit and the display unit (step 1135).

The vehicle determines whether or not a handsfree is in use based on a user manipulation (step 1137). When the handsfree is in use, the vehicle transmits and receives a call voice between the handsfree unit connected to the audio input/output unit and the mobile terminal through human body communication (step 1139), whereas when the handsfree is not in use, the mobile terminal performs a call communication function (step 1141).

Also, when the user makes a call by using the handsfree unit of the vehicle while the vehicle is driving, the vehicle displays a downloaded phone book or speed dial numbers on the display unit. When the user selects a certain phone number or a speed dial number, the vehicle transmits user selected information to the mobile terminal through human body communication. When the call is connected, the vehicle transmits and receives a call voice to and from the mobile terminal through human body communication.

Also, when a text message is received by the mobile terminal while the vehicle is driving, the mobile terminal transmits the text message and a signal indicating that the text message has been received to the vehicle through the user's body. Then, the vehicle displays the received text message through the display unit and the audio input/output unit and informs about the reception of the text message by outputting an audio signal.

The handsfree function while the vehicle is driving according to another exemplary embodiment of the present invention illustrated in FIG. 11 is advantageous in that it can replace the conventional handsfree function used by the vehicles using Bluetooth™, and because the human body is used as a medium, more stable call quality can be obtained.

Figure 12:
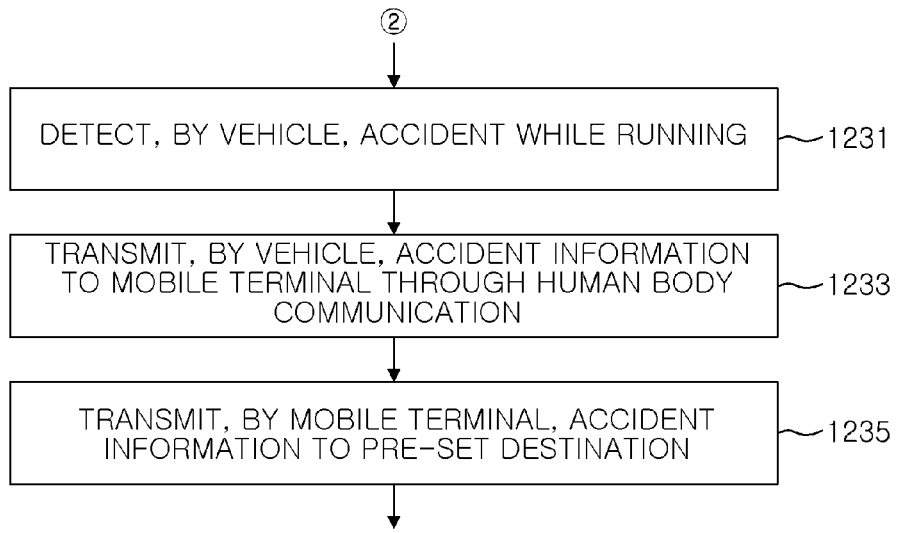
FIG. 12 is a flow chart illustrating the process of a method for providing a telematics service using human body communication according to another exemplary embodiment of the present invention, specifically illustrating the process of executing a vehicle accident management function.

FIG. 12 is a flow chart illustrating the process of a method for providing a telematics service using human body communication according to another exemplary embodiment of the present invention, specifically illustrating the process of executing a vehicle accident management function.

With reference to FIG. 12, while the vehicle is driving after the engine of the vehicle is started by performing steps 601 to 619 of FIG. 6, when an air bag of the vehicle pops out due to an accident or when an impact stronger than a pre-set level is detected, the central controller of the vehicle determines that a vehicle accident has happened (step 1231) and transmits accident information such as vehicle information, a vehicle state, the location of the vehicle, and the like, to the user's mobile terminal through human body communication (step 1233).

Upon receiving the accident information, the mobile terminal automatically transmits the accident information to a pre-set destination (e.g., an insurance company, police, hospital, paramedics, etc.) (step 1235). Here, the mobile terminal may transmit the accident information through an SMS message, and if the vehicle does not have a GPS receiver so the current location of the vehicle is not received, the mobile terminal automatically allows for the use of a mobile phone location tracking function available for car insurance companies, thus informing about the user location.

The function of coping with a vehicle accident according to another exemplary embodiment of the present invention as illustrated in FIG. 12 has the advantage in that an accident can be quickly handled in a possible emergency situation and the user security can be ensured in the emergency situation.

Figure 13:
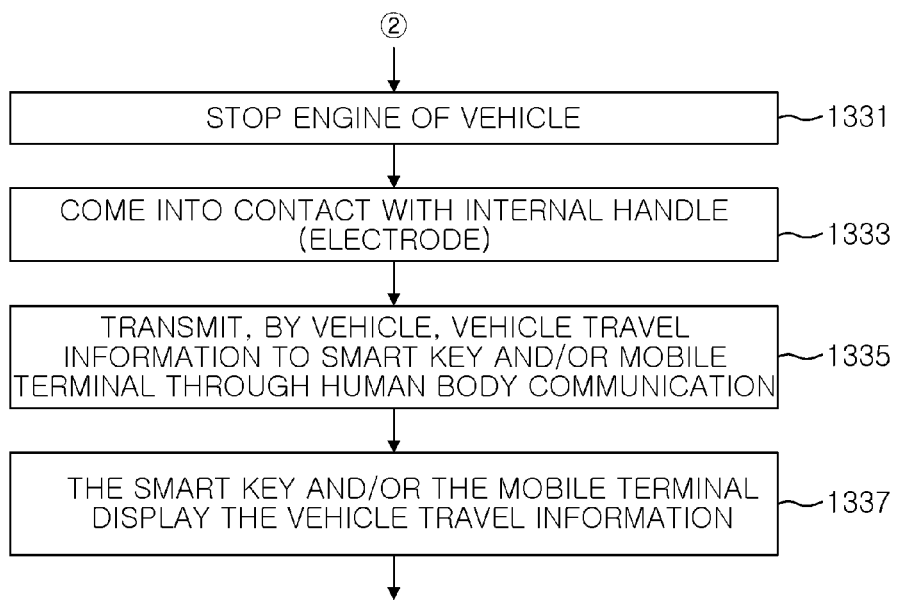
FIG. 13 is a flow chart illustrating the process of a method for providing a telematics service using human body communication according to another exemplary embodiment of the present invention, specifically illustrating the process of executing a travel information management function of a mobile terminal.
Figure 14:
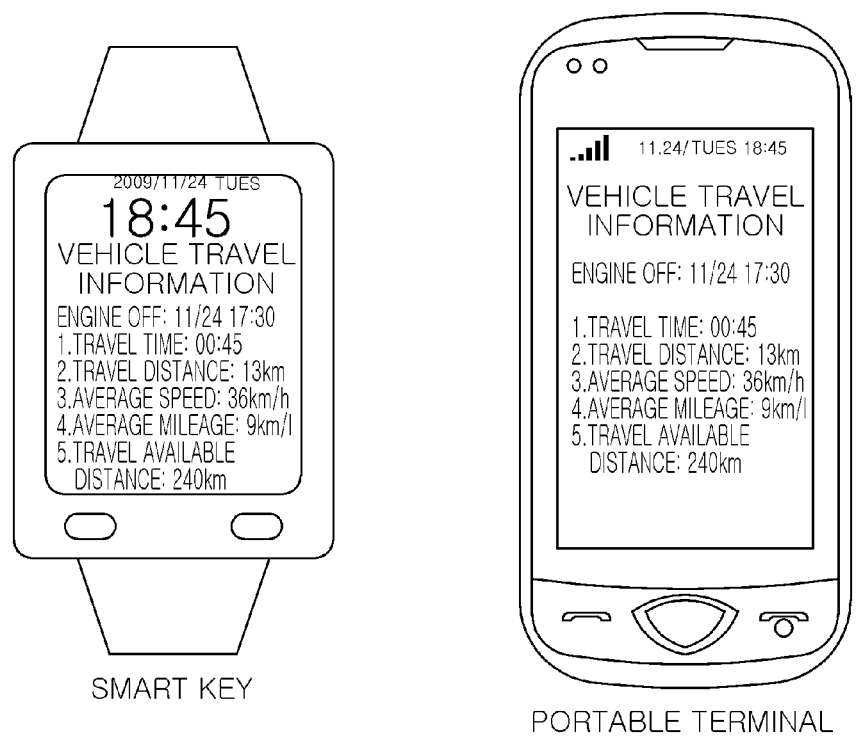
FIG. 14 shows screen images of a user interface displaying vehicle information transmitted through human body communication from a vehicle.

FIG. 13 is a flow chart illustrating the process of a method for providing a telematics service using human body communication according to another exemplary embodiment of the present invention, specifically illustrating the process of executing a travel information management function of a mobile terminal. FIG. 14 shows screen images of a user interface displaying vehicle information transmitted through human body communication from a vehicle.

With reference to FIGS. 13 and 14, in a state in which the user stops the engine of the vehicle by manipulating the start button of the vehicle (step 1331), when the user comes into contact with the electrode installed in the internal handle of the vehicle in order to get off the vehicle (step 1333), the vehicle transmits travel information (e.g., a travel time, a travel distance, an average speed, an average mileage, a travel available distance, etc.) of the vehicle to the smart key and the mobile terminal through human body communication (step 1335).

As shown in FIG. 14, the smart key and the mobile terminal display the vehicle travel information transmitted from the vehicle through human body communication on the display unit, respectively, (step 1337).

The travel information management function of the mobile terminal according to another exemplary embodiment of the present invention as shown in FIG. 13 is advantageous in that, when the engine of the vehicle is stopped, the vehicle travel information managed by the central controller of the vehicle is transmitted to the mobile terminal through human body communication, so the user can recognize the travel information of the vehicle in real time, and in addition, the vehicle can be effectively managed by interworking with a vehicle management application provided in the mobile terminal.

Figure 15:
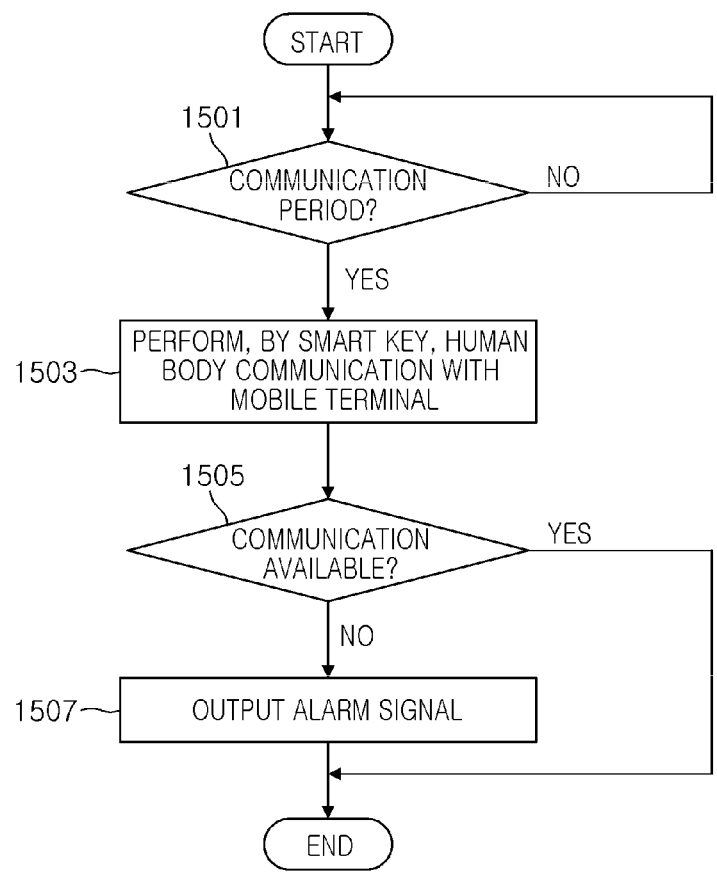
FIG. 15 is a flow chart illustrating the process of a method for providing a telematics service using human body communication according to another exemplary embodiment of the present invention, specifically illustrating the process of executing a mobile terminal loss prevention function.

FIG. 15 is a flow chart illustrating the process of a method for providing a telematics service using human body communication according to another exemplary embodiment of the present invention, specifically illustrating the process of executing a mobile terminal loss prevention function.

With reference to FIG. 15, the smart key determines whether or not a pre-set communication period has arrived (step 1501). When the smart key determines that the communication period has arrived, the smart key executes human body communication with the mobile terminal through the user's body (step 1503).

Thereafter, the smart key determines whether or not the communication has been successful (step 1505). If the smart key determines that the communication has not been successful, the smart key outputs an alarm signal (step 1507) to keep the user from losing his mobile terminal. Here, the smart key may not output the alarm signal when the user releases the loss prevention function.

In the exemplary embodiment illustrated in FIG. 15, the smart key performs human body communication with the mobile terminal and the alarm signal is output according to whether or not the communication is successful, but in a different exemplary embodiment, the mobile terminal may perform human body communication and output an alarm signal according to whether or not the communication is successful.

As set forth above, in the telematics system using human body communication, the portable device having a telematics function using human body communication, and the method for providing a telematics service using human body communication according to exemplary embodiments of the invention, a vehicle, a smart key, and a mobile terminal constitute a communication network through human body communication using a human body as a medium, to thereby provide a user authentication and vehicle security function, a function of providing alert information during parking, customized service function, a function of automatically synchronizing data between a mobile phone and a vehicle, a handsfree function while running, a function of coping with a vehicle accident, a travel information management function, and a mobile phone loss prevention function.

Thus, by simply carrying around a smart key or a mobile terminal available for human body communication, users can conveniently use various security-strengthened telematics functions through a simple contact.

While the present invention has been shown and described in connection with the exemplary embodiments, it will be apparent to those skilled in the art that modifications and variations can be made without departing from the spirit and scope of the invention as defined by the appended claims.

What is claimed is:

1. A telematics system using human body communication, the system comprising:
    a vehicle receiving an authentication key from at least one portable device through human body communication using a human body as a medium, and controlling the opening and closing of a door of the vehicle based on whether or not the received authentication key is valid;
    a first portable device transmitting a first authentication key to the vehicle through a user's body in contact with the vehicle;
    a second portable device transmitting a second authentication key to the vehicle through the user's body in contact with the vehicle,
    wherein the vehicle checks the validity of the first and second authentication keys, and when both the first and second authentication keys are valid, the door of the vehicle is opened.

2. The system of claim 1, wherein when the user's body is in contact with a start manipulation unit for starting the vehicle, at least one of the first and second authentication keys is received through the user's body, and when at least one of the authentication keys is valid, the vehicle is started.

3. The system of claim 1, wherein the vehicle stores at least one of information regarding an impact applied to the vehicle and information regarding a break-in attempt to the vehicle in a parked state, and
    when the authentication key is valid, the vehicle transmits at least one of the stored vehicle impact information and the break-in attempt information to the first portable device through the user's body,
    when an accident happens while the engine of the vehicle is running, the vehicle transmits accident information to the first portable device through the user's body, and
    when the engine of the vehicle is stopped, the vehicle transmits vehicle travel information including a travel distance to the first portable device through the user's body.

4. The system of claim 1, wherein the vehicle compares the first authentication key with a plurality of stored authentication keys to recognize a user corresponding to the first authentication key, and executes a function corresponding to the recognized user based on configuration information corresponding to the recognized user.

5. The system of claim 1, wherein the vehicle receives data stored in the first portable device from the first portable device through the user's body and synchronizes data in the vehicle with the data received from the first portable device.

6. The system of claim 1, wherein the vehicle and the first portable device provides a hands-free function by transmitting and receiving a voice signal and a call control signal through the user's body.

7. A portable device having a telematics function using human body communication, the device comprising:
    a controller reading and providing a stored authentication key when a user's body comes into contact with a vehicle;
    a human body communication unit converting the authentication key into a signal available for human body communication;
    an electrode transmitting a signal provided from the human body communication unit to the vehicle through the user's body; and
    a storage unit storing the authentication key;
    wherein the storage unit stores user's personal information including a personal phone book, a phone number and a speed dial number, and when the user's body comes into contact with the vehicle, the controller transmits the stored user's personal information to the vehicle through the user's body.

8. The device of claim 7, further comprising:
    a display unit displaying information transmitted through the user's body from the vehicle under the control of the controller; and
    a mobile communication unit transmitting a message including the information transmitted through the user's body from the vehicle to a pre-set destination.

9. The device of claim 7, wherein when a call or a message is received through the mobile communication unit, the controller transmits call or message reception information to the vehicle through the user's body.

10. A method for providing a telematics service of a system in which a vehicle and at least one portable device communicate by using human body communication, the method comprising:
    transmitting, by a first portable device, a first authentication key to the vehicle through a user's body;
    transmitting, by a second portable device, a second authentication key to the vehicle through the user's body; and
    determining, by the vehicle, the validity of the first and second authentication keys and opening the door of the vehicle when both the first and second authentication keys are valid.

11. The method of claim 10, further comprising:
    transmitting, by the vehicle, at least one of information regarding an impact applied to the vehicle and information regarding a break-in attempt to the vehicle in a parked state to at least one of the first and second portable devices through the user's body, after the operation of opening the door of the vehicle; and displaying, by any one of the first and second portable devices which has received the vehicle impact information or the break-in attempt information, the received information.

12. The method of claim 10, further comprising:

recognizing, by the vehicle, the user based on at least one of the first and second authentication keys, after the operation of opening the door of the vehicle;

acquiring configuration information of the vehicle corresponding to the recognized user; and executing a function of the vehicle based on the acquired configuration information of the vehicle.

13. The method of claim 10, further comprising:

when the user comes into contact with a start manipulation unit for starting the vehicle, providing, by the first and second portable devices, the first and second authentication keys, respectively, after the operation of opening the door of the vehicle; and when both the first and second authentication keys are valid, executing starting by the vehicle.

14. The method of claim 13, further comprising:

transmitting, by at least one of the first and second portable devices, stored data to the vehicle through the user's body, after the operation of starting is executed; and synchronizing, by the vehicle, the data transmitted from at least one of the first and second portable devices with stored data.

15. The method of claim 13, further comprising when the vehicle detects an accident while driving, transmitting, by the vehicle, the accident information to at least one of the first and second portable devices through the user's body, after the operation of starting is executed; and transmitting, by any one of the first and second portable devices which has received the accident information, the accident information to a pre-set destination.

16. The method of claim 13, further comprising:

when the engine of the vehicle stops, transmitting, by the vehicle, vehicle travel information to at least one of the first and second portable devices through the user's body, after the operation of starting is executed; and displaying, by any one of the first and second portable devices which has received the vehicle travel information, the vehicle travel information.

17. The method of claim 13, further comprising:

transmitting, by one of the first and second portable devices, call reception information to the vehicle through the user's body, after the operation of starting is executed; and when the user uses a handsfree unit installed in the vehicle, transmitting and receiving a call voice through the user's body between the vehicle and the portable device which has received the call.

* * * * *